United States Patent [19]
Elliott

[11] Patent Number: 5,522,423
[45] Date of Patent: Jun. 4, 1996

[54] FORGED BODY FULL PORT SWING CHECK VALVE

[76] Inventor: Pat S. Elliott, 2608 Green Tee Dr., Pearland, Tex. 77581

[21] Appl. No.: 290,396

[22] Filed: Aug. 15, 1994

[51] Int. Cl.⁶ .................................................. F16K 15/03
[52] U.S. Cl. ...................... 137/515.7; 137/527.8
[58] Field of Search ............................. 137/515.7, 527.8

[56] References Cited

U.S. PATENT DOCUMENTS

| | | |
|---|---|---|
| 818,670 | 4/1906 | Dumbolton ........................ 137/515.7 |
| 1,638,546 | 8/1927 | Murray . |
| 1,738,567 | 12/1929 | Flodin . |
| 1,858,927 | 5/1932 | Gray et al. . |
| 2,021,703 | 11/1935 | Sparks . |
| 2,111,706 | 3/1938 | Tollefson . |
| 2,133,742 | 10/1938 | Forbes . |
| 2,165,228 | 7/1939 | Cornell, Jr. . |
| 2,169,896 | 8/1939 | Gazey . |
| 2,589,176 | 3/1952 | Wheatley ........................... 137/527.8 |
| 2,616,164 | 11/1952 | Tiedemann . |
| 2,669,011 | 2/1954 | Brumbaugh . |
| 2,756,017 | 7/1956 | Silverman . |
| 3,565,107 | 2/1971 | Bunch . |
| 3,613,720 | 10/1971 | Welch . |
| 3,681,960 | 8/1972 | Takokoro . |
| 3,720,225 | 3/1973 | Wheatley ........................... 137/527.8 X |
| 3,720,228 | 3/1973 | Wheatley, Jr. . |
| 3,769,673 | 11/1973 | Siepmann . |
| 3,933,173 | 1/1976 | Kajita . |
| 3,937,240 | 2/1976 | Nanny . |
| 4,036,252 | 7/1977 | Wheatley . |
| 4,054,153 | 10/1977 | Guyton . |
| 4,230,150 | 10/1980 | Scaramucci . |
| 4,349,948 | 9/1982 | Muller et al. . |
| 4,356,612 | 11/1982 | Becker et al. . |
| 4,469,122 | 9/1984 | Meek . |
| 4,535,519 | 8/1985 | Kajikawa et al. . |
| 4,768,268 | 9/1988 | Ishihara et al. . |
| 4,799,303 | 1/1989 | Prinz et al. . |
| 4,809,741 | 3/1989 | Scaramucci . |
| 4,832,076 | 3/1989 | Scaramucci . |
| 4,872,478 | 10/1989 | Scaramucci . |
| 4,872,479 | 10/1989 | Scaramucci ........................ 137/515.7 |
| 4,905,728 | 3/1990 | Scaramucci . |
| 4,967,790 | 11/1990 | Ganske . |

*Primary Examiner*—John Rivell
*Attorney, Agent, or Firm*—Sue Z. Shaper; Butler & Binion

[57] ABSTRACT

A full port swing check valve having a forged body and providing for the use of a replaceable swing wafer cartridge insert.

5 Claims, 3 Drawing Sheets

FORGED BODY FULL PORT SWING CHECK VALVE

FIELD OF THE INVENTION

This invention relates to the field of swing check valves and, more particularly, to full port swing check valves.

BACKGROUND OF THE INVENTION

Valve manufacturers have supplied full port swing check valves for many years. These valves are invariably offered with cast bodies. The asserted advantages of cast bodies have been assumed, and are believed, to far outweigh any disadvantage.

The advantages of casting that dominate the thinking of the valve manufacturers are: (1) Casting makes possible designing essentially two piece bodies having complex, asymmetrical, detailed shapes. (2) Casting offers great versatility in alloy selection. (3) The tooling cost for casting is typically low. (4) Proper heat treating of casting reduces two conceivable disadvantages, brittleness and inflexibility.

The thinking in the industry has evolved to the point where a conviction exists that cast bodies are the only economically feasible and commercially viable alternative for swing check valves. The established valve manufacturers do not offer a forged body full port swing check valve and will not bid such a valve. Even if specified for a job, present valve manufacturers stubbornly quote a cast body valve.

In response to this unfilled need, the present inventor has invented a novel valve, e.g., a forged steel full port swing check valve. Forged steel has advantages of its own. Importantly, forged steel is less likely than cast steel to contain flaws. Flaws mean defects that might result in a leak. In particular, a forged steel body does not require welding for finishing the body to remove sand spots and slag, and a forged steel body does not require heat to remove excess metal from runners, gates, and risers. Both welding and the application of heat to a cast body can lead to structural weaknesses. To the contrary of casting, the forging process itself, the working of the metal, is believed to increase the flexibility of the steel and to align the granularity between the molecules, thereby enhancing the strength of the work piece. Experience shows that defect testing of cast valve bodies leads to the rejection of five to ten percent of the units. Similar reject testing of forged steel valve bodies results in a typical rejection of less than a half a percent. Therefore, because of enhanced environmental concerns associated with the operation of chemical and petrochemical plants and the transportation and storage of toxic fluids, a forged body full port swing check valve could have significant advantages.

Forged steel's major disadvantage is the inability to be formed into complex shapes. Forged body designs are limited to those that have simple shapes. Historically, a full port swing check valve does not exhibit a "simple shape". A "forged steel" full port swing check valve thus would have to overcome a major design obstacle, namely, being able to be "forged" in the standard two pieces.

SUMMARY OF THE INVENTION

This invention comprises a full port swing check valve having a "forgeable" two piece body. The body includes an upstream unit and a downstream unit. Each unit defines a passage having a minimum internal diameter. Means are provided, as part of the forged body, for attaching each unit to pipe also having the minimum internal diameter. The valve provides for using a standard off-the-shelf replaceable swing wafer cartridge insert that has a valve port of the same minimum internal diameter. Means are provided, as part of the forged body, for mating the upstream and downstream units such that the cartridge is contained between the two. The passages of the units communicate through the port of the cartridge. The downstream unit has a portion of enlarged internal diameter, within its forged body, that defines a cavity for receiving the swinging wafer of the cartridge. In a preferred embodiment, the enlarged interior diameter extends symmetrically around the circumference of the upstream interior end of the downstream unit.

In preferred embodiments the means for attaching the upstream unit and the downstream unit with the pipe include a flange portion forged on the respective upstream and downstream ends of each unit. The flange has holes for bolting to a mating pipe flange.

In preferred embodiments each unit has a forged shoulder upon its interior end for receiving the cartridge insert, the shoulder lying at the end opposite the end containing the means for attaching to the pipe.

The means for the interior mating of the two units in a preferred embodiment also comprises a flange forged on interior ends of each unit. Each mating flange has holes for bolting together. Alternatively, the flanges could be welded together.

BRIEF DESCRIPTION OF THE DRAWINGS

A better understanding of the present invention can be obtained from the detailed description of exemplary embodiments set forth below, to be considered in conjunction with the attached drawings, in which.

DETAILED DESCRIPTION OF THE PREFERRED EMBODIMENTS

Figure 1:
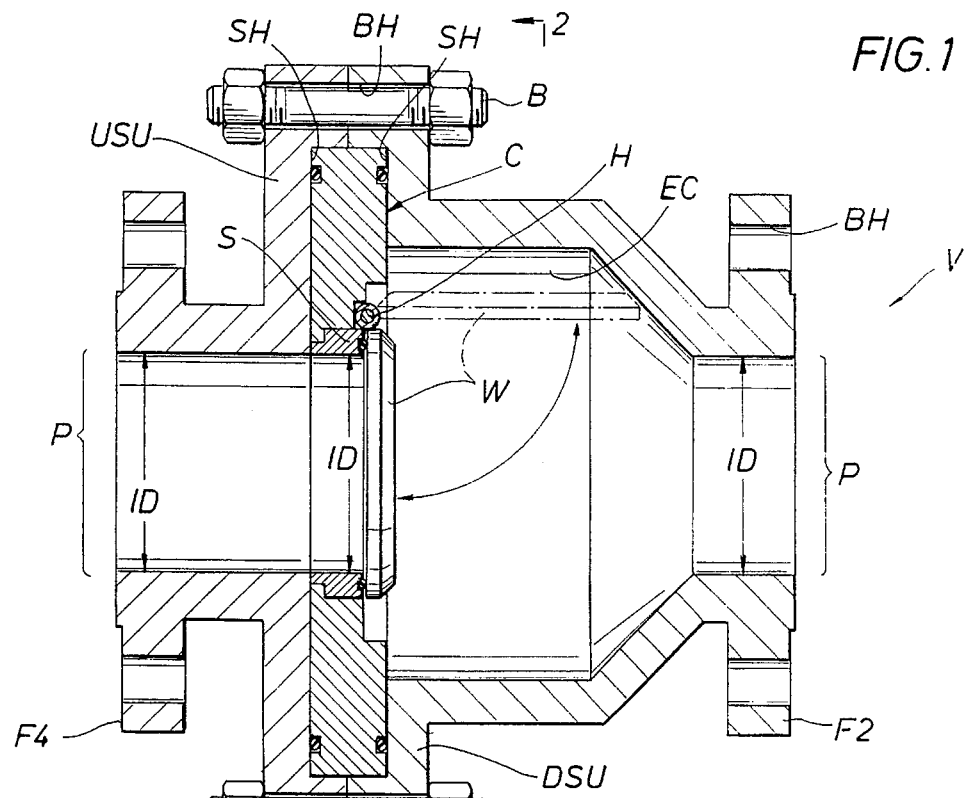
FIG. 1 illustrates a preferred embodiment of the present invention in cross section, showing movement of the swing check wafer with dotted lines.

FIG. 1 illustrates a preferred embodiment of the present invention. The valve of FIG. 1 is comprised of upstream unit USU and downstream unit DSU, each being of sufficiently simple design, as is apparent upon inspection, that they can be forged from steel using known techniques in the art. Both upstream unit USU and downstream unit DSU have minimum internal diameters ID, designed to mate with pipe of internal diameter ID. The full port opening P of each unit is of the same internal diameter, ID. The upstream unit has upstream end flange F4. The downstream unit has downstream end flange F2. Each flange is designed to mate with pipe of interior diameter ID. It is presumed that such pipe has mating flanged ends. Flanges F4 and F2 are shown with bolt holes BH for mating with pipe flanges. Alternately, flanges F4 and F2 could be welded to end flanges on the pipe. Other means of mating valves with pipe are known and are within the spirit and scope of this invention, such as screw means or box and pin means.

Upstream unit USU and downstream unit DSU terminate at their interior faces in flanges F3 and F1, respectively. Flanges F3 and F1 are shown with bore holes BH and bolts B to secure the two units together. Typically a gap G of approximately one-eighth inch separates the mating of the USU with the DSU in order to ensure compression of seals beween the retainer-cartridge and the respective USU and DSU.

Figure 3A:
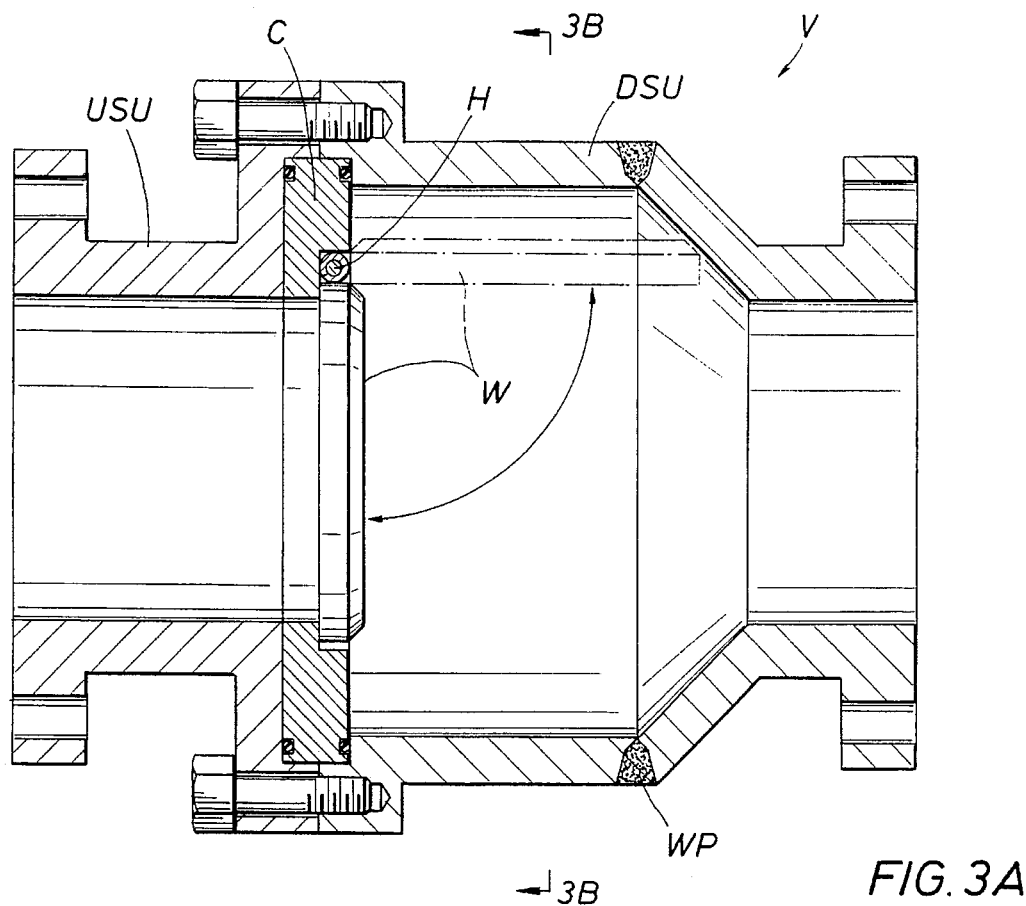
FIGS. 3A and 3B illustrate in horizontal cross-section and vertical cross-section, respectively, one embodiment of a valve of the present invention.
Figure 4A:
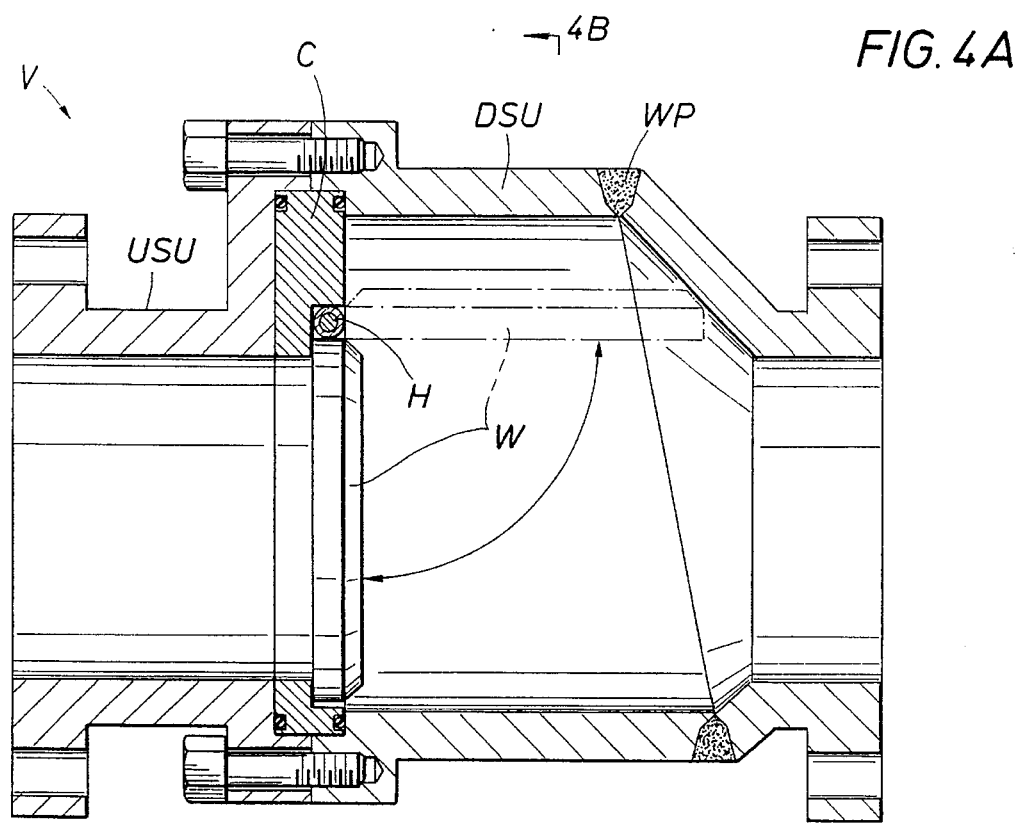
FIGS. 4A and 4B illustrate in horizontal cross-section and vertical cross-section a further embodiment of a valve according to the present invention.

Alternately the flanges could be welded together. It will be understood that after the flanges are welded together, the cartridge is no longer easily replaceable. In large valves also, as illustrated in FIGS. 3A and 4A, the downstream unit DSU might be forged in two pieces and welded together at illustrated weld points WP.

A standard replacement off-the-shelf swing wafer cartridge C is shown resting between shoulders SH of the upstream unit and the downstream unit. Wafer W is shown in FIG. 1 in its closed position and by dotted lines in its open position. Wafer W opens and closes by swinging upon hinge S. In its closed position wafer W closes against seating element S. Shoulders SH are dimensioned in flanges F3 and F1 to enclose cartridge C therebetween. Cartridge C is chosen to have a full port opening of diameter ID when fully opened. Alternately, cartridge C could be sandwiched between the flanges without a shoulder.

Downstream unit DSU contains an enlarged interior diameter chamber EC adjacent the downstream unit's upstream end. Enlarged interior portion EC is sufficiently large to retain wafer W in its open position such that cartridge valve C can open to comprise a full port valve.

Figure 2:
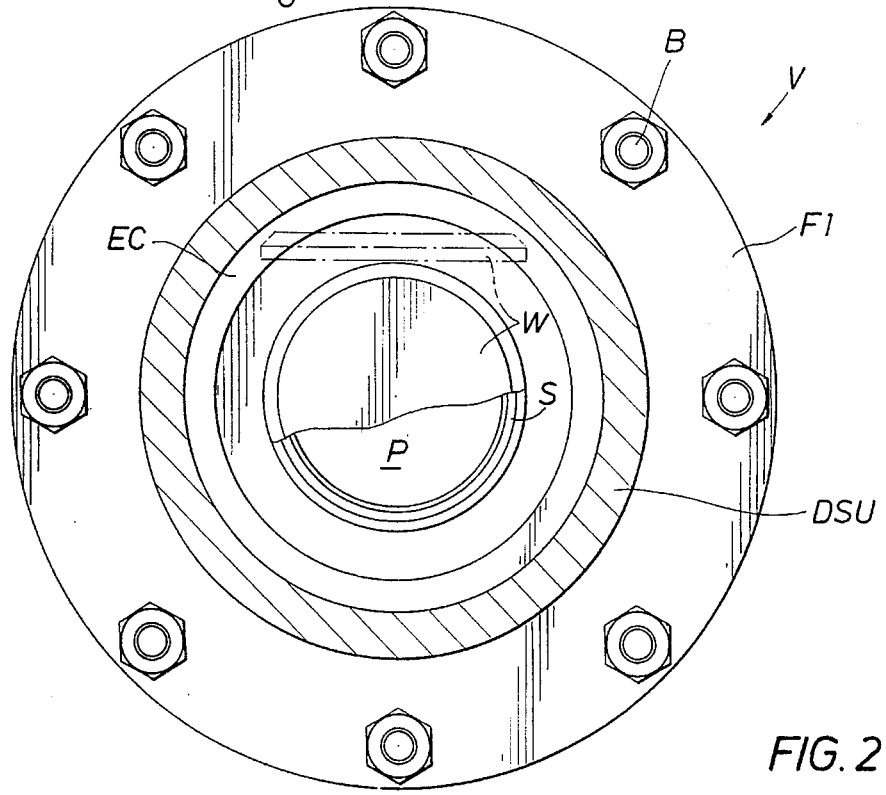
FIG. 2 offers a cross section view of the downstream unit of the valve looking through the valve in FIG. 1.

An important aspect of the design of upstream unit USU and downstream unit DSU is that they are configured to be readily forged. The two units are illustrated as bolting together with bolts B through bolt holes BH at flanged ends of each unit. Alternately, the flanged ends of each unit can be welded together. However, bolting the units together permits unbolting the units and replacing cartridge C, should the need and the opportunity arise. Suitable cartridges are available from various manufacturers in the trade. FIG. 2 illustrates an end cross sectional view of the valve V. The full port opening P is illustrated in the middle. Surrounding P is seal S. Enlarged chamber EC is shown surrounded by the body of downstream unit DSU. Shoulder SH in the downstream unit DSU is indicated by dashed lines. The outside of the cross section is comprised of flange F1 showing one borehole BH. Wafer W in FIG. 2 is shown in the open position, residing in chamber EC.

Figure 3B:
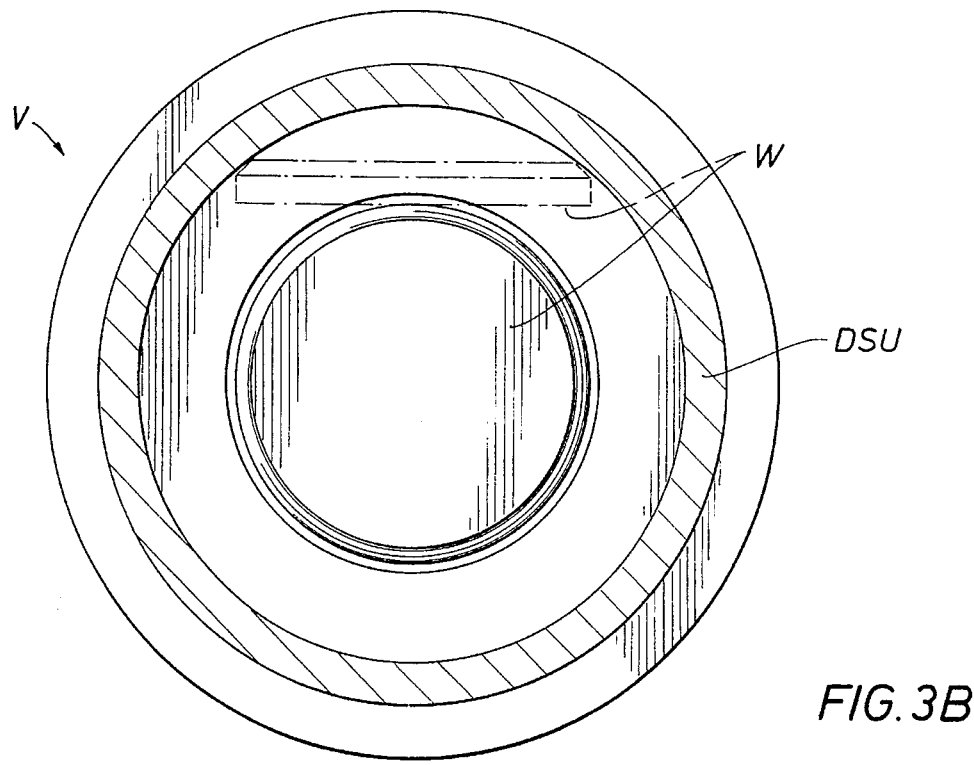
Figure 4B:
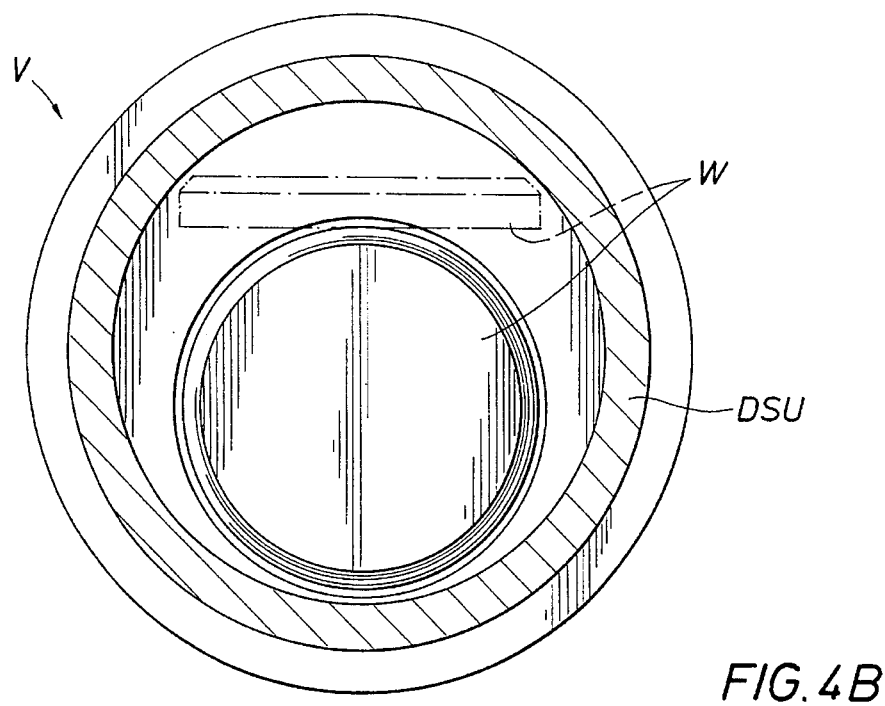

FIGS. 3 and 4 illustrate by comparison an altered embodiment of the present invention. FIGS. 4A and 4B illustrate an improved embodiment of the present invention under certain circumstance. The valve of FIG. 3 corresponds to the valve of FIG. 1 in design. It can be seen through FIG. 3B, comprising a vertical cross-section of the valve of FIG. 3A, that, in general, in the downstream unit, there is a fair amount of wasted or extra space within the valve. This wasted or extra space, especially for larger valves, e.g. valves with diameter of 8 inches and above, represents wasted metal. The valve embodiment of FIGS. 4A and 4B improves this situation. In essence, in the valve of FIG. 4A, the flange portions and interior chamber portion of the valve have been shifted upwardly, or in the direction in which the wafer hinge resides. Alternately, as FIGS. 3B and 4B illustrate, the center of diameter for portions of the forged units of the valve has been shifted downwardly, away from the hinge area. In such matter, as can be seen by comparison of FIGS. 3B and 4B, the same wafer in a full port valve can be housed within forged upstream and downstream units having smaller outside diameters. By so adapting the valve, significant metal costs can be saved.

It should be noted, on the other hand, that in a valve constructed according to the design of FIGS. 4A and 4B, the retainer cartridge portion, at least, of any wafer insert must be specially constructed. It does not coincide with existing off-the-shelf wafer cartridge retainer designs.

The foregoing disclosure and description of the invention are illustrative and explanatory thereof, and various changes in the size, shape, and materials, as well as in the details of the illustrated system may be made without departing from the spirit of the invention.

What is claimed is:

1. A full port swing check valve comprising an upstream unit and a downstream unit, each unit including an integral piece of forged steel defining an interior passage, the passages defining a minimum internal diameter;

a replaceable swing wafer cartridge insert having a port of said internal diameter;

said units having integral flanged means for mating said units to contain the cartridge therebetween such that the interior passages of the units communicate through the port;

the downstream unit having a portion of enlarged internal diameter to define a circumferential cavity to receive a swinging wafer; and said units having integral flanged means for attaching each unit to a pipe having said internal diameter.

2. The apparatus of claim 1 wherein the means for attaching each unit to a pipe comprises a flange forged on an end of each unit, the flange having holes for bolting to a pipe flange.

3. The apparatus of claim 1 wherein the means for mating the units comprises a flange forged on an end of each unit, each flange having holes for bolting together.

4. The apparatus of claim 1, wherein the means for mating the units comprises a flange forged in an end of each unit, each flange having a shoulder for receiving said cartridge in arbitrary rotational orientation.

5. The apparatus of claim 1 wherein the portion of enlarged interior diameter extends around the circumference of the upstream end of the downstream unit.

\* \* \* \* \*